Figure 1:
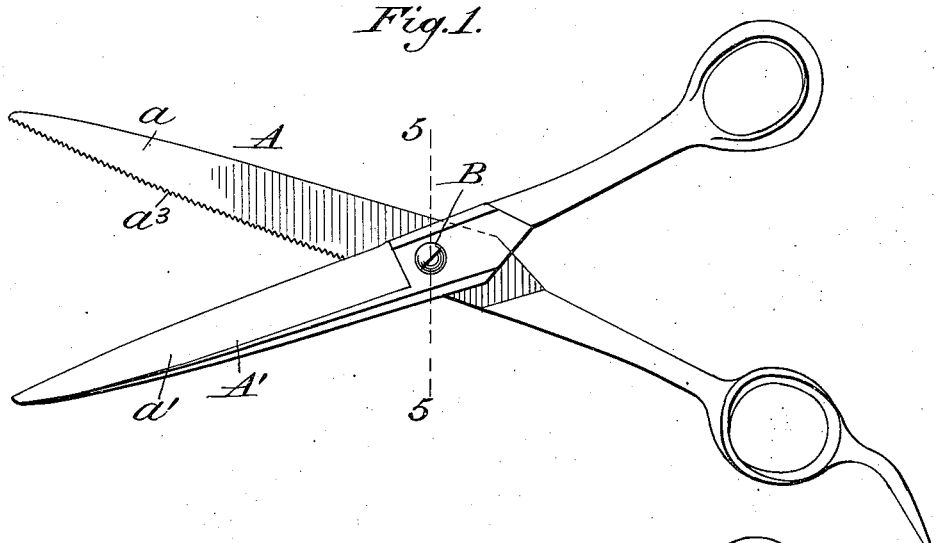

No. 617,964. Patented Jan. 17, 1899.
A. J. KRANK.
SHEARS.
(Application filed Feb. 14, 1898.)
(No Model.)

Witnesses
Franklin H. Schott
Raymund Gloetzner

Inventor
Alfred J. Krank
by [Attorney signature]
Attorney

UNITED STATES PATENT OFFICE.

ALFRED JACOB KRANK, OF ST. PAUL, MINNESOTA.

SHEARS.

SPECIFICATION forming part of Letters Patent No. 617,964, dated January 17, 1899.

Application filed February 14, 1898. Serial No. 670,256. (No model.)

*To all whom it may concern:*

Be it known that I, ALFRED JACOB KRANK, a citizen of the United States, residing at St. Paul, in the county of Ramsey and State of Minnesota, have invented certain new and useful Improvements in Shears; and I do hereby declare the following to be a full, clear, and exact description of the invention, such as will enable others skilled in the art to which it appertains to make and use the same.

My invention relates to improvements in shears or scissors for tonsorial and other purposes.

The object of my invention is to provide a pair of shears or scissors in which the individual hairs will be held so that they cannot slip away from the shears along the edge of said shears when the latter are closing. For the purpose of accomplishing this object my invention consists in providing one or both blades of a pair of scissors or shears with a serrated or toothed edge, whereby the individual hairs will be caught by such teeth and held against movement along the edge of the blade, and therefore will be cut by the closing of the blades instead of sliding off the latter.

My invention consists, further, in beveling each margin or edge of each tooth at a sharp angle to the plane of movement of the blades, so that said edges themselves become or partake of the nature of small blades, whereby it results that the individual hairs are not only held by the serrations, but may also be severed by the sharp edges of such serrations.

I am aware that heretofore shears have been made having in view the object of holding the individual hairs from slipping along the blades; but in all those constructions of which I have any knowledge the shear-blades were not themselves provided with serrated edges, but instead the teeth were formed on a separate plate, which was then attached to one of the blades in such a manner that the teeth would project slightly beyond the edge of the blade to which it was attached. This construction has many serious disadvantages, as follows: The shears or scissors so constructed are heavier, owing to the weight of the plate. This added weight, though perhaps not of any moment where the shears are used infrequently, becomes exceedingly inconvenient where the shears are in constant use, as is the case with barbers' shears. Again, the separate plate and the means for securing it to the blade require more labor in their production, and hence are more expensive. Furthermore, there are inherent difficulties connected with the manufacture of these separate plates, for the reason that it is difficult to make them in large quantities, so that they will conform exactly to the shape of the edge of the shears, and even where this has been done the first grinding of the shear-blades to sharpen them will destroy this unity of curvature, and every resharpening afterward will tend in the same direction. The failure of the plate to conform in curvature to the shape of the blade to which it is attached will result in differences in the cutting action, whereby some of the individual hairs may be cut off smoothly, while others will be dragged down between the blades and thereby pulled instead of cut. Besides this, owing to the fact that it is customary and necessary for a barber when cutting hair to push the blades into the mass of hair in order to lift the same slightly from the head, individual hairs will enter between the plate and the blade to which it is attached, and thereby again the hairs will be pulled. Moreover, the teeth of the plate cannot lie as close to the cutting edge as is necessary in order to hold the individual hairs at the cutting-point, whereby it results that with such an attached plate a certain amount of slipping of the individual hairs along the cutting edge will occur, owing to the flexibility of the hair. Finally, on sanitary grounds such an attached plate is disadvantageous, since it furnishes a place for dirt and dust to lodge and cannot readily be cleaned. All these disadvantages I avoid by my construction, wherein the shear-blade itself is provided with the serrations. In addition, as the blades of good shears are made of a fine grade of material, the serrations can be made much finer or closer than if made of coarser material. Therefore there is a saving by my invention over those shears having an attached plate with projecting teeth, since to make the teeth on the plate as close together as they should be would require that the plate also be made of a fine grade of material, and this would again enhance the cost of production.

Another valuable feature in connection with my invention consists in beveling the edges of the serrations or teeth in the blades so that they will be at a sharp angle with the plane of movement of the shear-blades, whereby the edge of each individual notch or recess will form a miniature shear-blade with a sharp cutting edge, which as it passes along the edge of the other shear-blade will cut along its entire contour. The effect where a straight cutting-blade is employed in conjunction with the notched or serrated blade is thus not only to hold the hairs within the recesses or notches of the serrated blade against slipping under the advance of the straight blade, but also the same as though the straight blades were cutting against and shifting along a cutting-blade much longer and almost twice its length. There is thus a very effective shear action produced.

My invention will now be described in connection with the drawings and then pointed out in the claims.

Figure 2:
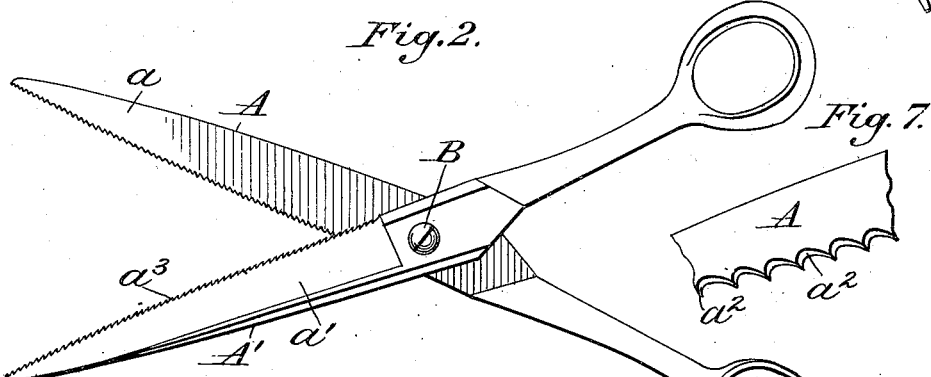
Figure 6:
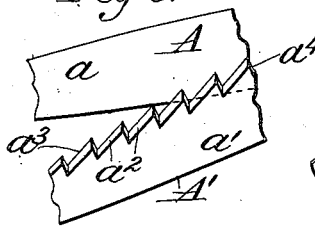
Figure 3:
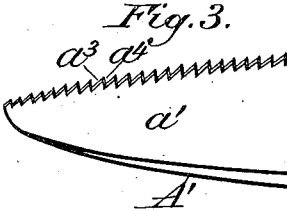
Figure 4:
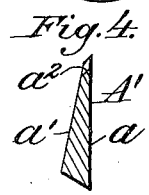
Figure 5:

In the drawings, Figure 1 is a side elevation of a pair of barber's shears embodying my invention, one only of the blades having a serrated edge; Fig. 2, a similar view showing both blades provided with a serrated edge; Fig. 3, an enlarged detail view, in side elevation, of a portion of a serrated blade; Fig. 4, a detail transverse section of a serrated blade on the line 4 4, Fig. 3; Fig. 5, a transverse section on the line 5 5, Figs. 1 and 2; Fig. 6, a detail view, on a greatly-enlarged scale, of a serrated blade, the teeth having their individual teeth provided with beveled or cutting edges; and Fig. 7, a similar view showing another form of serration embodying my invention.

Referring to the drawings, A A' are the blades, connected for movement toward and from each other in any suitable manner, as by a pivot-pin B, which in this instance passes loosely through one blade and is screwed into the other blade, whereby the blades are held together.

As shown in Fig. 4, the blade, which is serrated, has its outer side $a'$ sloping toward, but not intersecting, the inner side $a$ of the blade, whereby a thick edge is left. This edge is then provided in any suitable manner—as, for example, by filing—with a series of indentations, preferably as close as they can practically be made, whereby a series of teeth are formed, the bottoms of the indentations between the teeth forming a sharp angle with the plane of movement of the shear-blades, whereby the said bottoms of the indentations act as cutting-edges. In addition I form a cutting edge on each edge or margin of each individual tooth by sloping or beveling said edges at a sharp angle to the plane of movement of the blades, as shown at $a^2$ in Figs. 6 and 7. By this arrangement each serration is, in fact, a miniature shear-blade which cuts along its entire contour. The effect is also the same as though the straight blades were cutting against and shifting along a blade much longer than the serrated blade. There is thus a very effective shear action. Furthermore, the teeth are preferably formed as ratchet-teeth—that is to say, with one edge $a^3$ sloping gradually toward the handle portions or the pivotal point of the shears, while the other side $a^4$ of such tooth is at or more nearly at right angles to the length of its blade. By this construction the individual hairs to be cut will be received in the bottom of each indentation and the closing of the blades will cause the shearing off of such hairs, the teeth preventing them from slipping toward the ends of the blades as the latter close.

By forming the teeth in the preferable manner as ratchet-teeth with their slopes or greatest slopes on the sides of the teeth facing the ends of the shears the blades may be inserted readily into a mass of hair without the individual hairs catching in the teeth, yet at the same time the said hairs cannot be crowded out of the indentations by the closing of the blades, as they might be if the sides of the teeth facing the handle portions of the shears were also sloped to any great extent. Moreover, by making the bottom of the indentations substantially at a sharp angle to the plane of movement of the blades the individual hairs will be cut without any tendency on their part to bend and thereby cause a longitudinal movement or pulling of the hair. In addition to this by making a cutting edge on each margin of each serration or tooth the cutting-surface of the serrated blade is greatly increased, and consequently a most advantageous shear action takes place between the two blades, which results in a much more effective cutting action.

To resharpen a blade serrated in accordance with my invention, the flat or inner side $a$ only need be ground, this side being kept flat against the stone.

It will be obvious that shears or scissors made in accordance with my invention are simple, easily cleaned, and light, and, furthermore, will cut the hair without any pulling or slipping of the same, while the cost of production will be so slightly in advance of the ordinary shears as to form no bar to a general use of the improved and more advantageous form.

It is to be understood that I do not limit my invention to barbers' shears only, since it may also be applied to animal-shears and similar articles.

Figure 7:
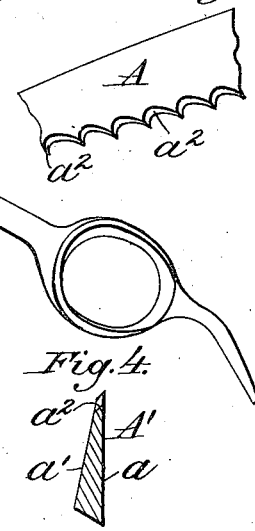

Furthermore, it is not absolutely essential that the teeth shall be triangular, as shown in Figs. 1 to 6, inclusive, since the edge of the blade may be otherwise indented, as in the form shown in Fig. 7, where the individual teeth have curved sides and the indentations are consequently curved instead of triangular.

Having thus fully described my invention, what I claim as new, and desire to secure by Letters Patent of the United States, is—

1. A pair of shears or the like having a cutting edge provided with indentations forming intermediate teeth, the sides of said teeth being sloped at an angle to the plane of movement of the blades, thus forming cutting edges, substantially as described.

2. A pair of shears or the like having a cutting edge provided with indentations forming intermediate ratchet-teeth, the sloping sides of said teeth being toward the ends of the blades, the sides of said teeth being also sloped at an angle to the plane of movement of the blades, thus forming cutting edges, substantially as described.

In testimony whereof I affix my signature in presence of two witnesses.

ALFRED JACOB KRANK.

Witnesses:
 F. O. HAMMER,
 A. R. KEIFER.